United Stat

Tsuruta et al.

[15] 3,639,030
[45] Feb. 1, 1972

[54] HOLOGRAPHIC METHOD OF FARMING CONTOUR LINES IN AN IMAGE UTILIZING LIGHT OF LIMITED COHERENCE LENGTH

[72] Inventors: Tadao Tsuruta; Yoshinobu Ito, both of Tokyo, Japan

[73] Assignee: Nippon Kogaku K.K., Tokyo, Japan

[22] Filed: June 2, 1970

[21] Appl. No.: 42,841

[30]  Foreign Application Priority Data

June 24, 1969   Japan....................................44/49298

[52] U.S. Cl...................................350/3.5, 356/2, 356/106, 356/112
[51] Int. Cl.................................G02b 27/00, G01c 11/00
[58] Field of Search.........................350/3.5; 356/2, 106, 112

[56]  References Cited

OTHER PUBLICATIONS

Bobrinev, et al., Radio Engineering and Electronic Physics, vol. 13 No. 11, Nov. 1968, pp. 1814–1815

*Primary Examiner*—David Schonberg
*Assistant Examiner*—Ronald J. Stern
*Attorney*—Marn & Jangarathis

[57]  ABSTRACT

This invention provides a device for forming hologram. Fabry-Perot etalon is interposed in the parallel reference light rays. The distance D of Fabry-Perot etalon is made substantially equal to the coherent length L of the light to be used, so as to produce a number of reference light ray groups having a light path difference of 2D for increasing the depth of reproduction.

Further, by making the distance D satisfying 2D>L, contour lines in terms of 2D are formed for measuring the depth of an object.

1 Claims, 2 Drawing Figures

HOLOGRAPHIC METHOD OF FARMING CONTOUR LINES IN AN IMAGE UTILIZING LIGHT OF LIMITED COHERENCE LENGTH

The present invention relates to a method for increasing a reconstruction depth in holography.

In holography, the light reflected from an object or transmitted through this object must interfere with the reference beam in order that the interference fringe may be formed upon a hologram plate. Therefore, when the optical-path differences between the beam illuminating the object to be recorded and the reference beam is longer than the coherent length of the used light, no interference fringe is formed so that no image is reproduced from the hologram. Thus, the depth of the image produced by holography is equal to or smaller than the said coherent length of the used light.

In view of the above, the present invention has for its object to provide a method for increasing a reconstruction or reproduction depth several to ten times the coherent length.

According to the present invention, a Fabry-Perot etalon is interposed in the optical path of the parallel reference wave in a holographic apparatus for making a hologram in such a manner that the spacing D of the Fabry-Perot etalon is substantially equal to a half of the coherent length L of the used light, thereby producing a large number of reference beams whose optical-path differences are 2D, whereby the reconstruction depth can be increased.

Furthermore, in accordance with the present invention, the spacing D of the Fabry-Perot etalon is so arranged as to satisfy the condition of 2D>L, thereby forming contour lines whose spacing is 2D upon the image produced so as to measure the depth of the object.

One preferred illustrative embodiment will be described hereinafter with reference to the accompanying drawing.

Figure 1:
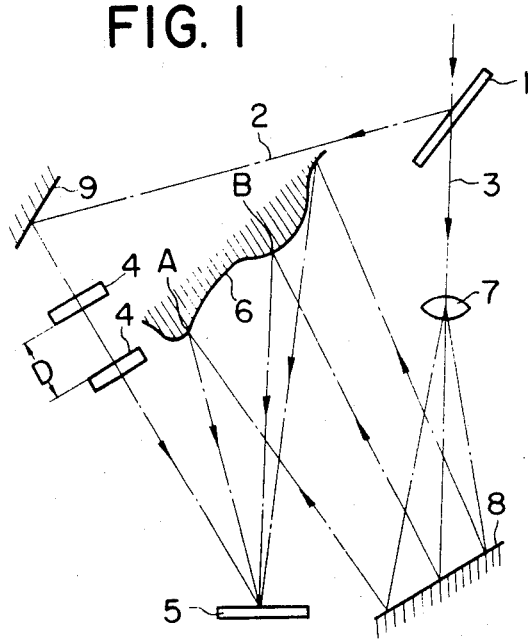
FIG. 1 is for explanation of one embodiment of the present invention.

First referring to FIG. 1, the light beam is divided into beams 2 and 3 by a beam splitter 1 such as a half-silvered mirror. The parallel wave reference beam 2 illuminates a hologram 5 through a reflecting mirror 9 and a Fabry-Perot etalon 4. The other beam 3 illuminates an object 6 through a lens 7 which broadens the beam 3 and a reflecting mirror 8. The light reflected from an object 6 reaches the hologram 5 where the light reflected back from the object 6 interferes with the reference beam 2 so that a hologram is formed.

In this case, the condition that the clear reconstruction of the image of the object 6 is that the optical length difference between the optical length $l_1$ of the reference beam 2 from the beam splitter 1 to the hologram plate 5 and the optical length $l_2$ of the other beam 3 from the beam splitter 1 to the hologram plate 5 is less than the coherent length L of a light source. First let us consider the case in which the Fabry-Perot etalon 4 is not interposed in the reference beam optical path. When there exists a relation of $l_2-l_1=0$ with respect to a point B upon the object 6, the relation of $|l_2-l_1|<L$ with respect to a point A upon the object must be satisfied in order that the point A may be recorded upon the hologram 5. When the Fabry-Perot etalon 4 is interposed in the reference beam optical path, there are produced a large number of light beams whose optical-path differences are 2D, where D is a spacing between the two the etalon 4.

Therefore, the object-illuminating beam having an optical length $l_2$ which can satisfy the relation of $|l_2-l_1|<L+2nD$ can record a point on the object 6 upon the hologram 5, where $2n$ is a positive even number of reflections by the Fabry-Perot etalon 4.

Figure 2:
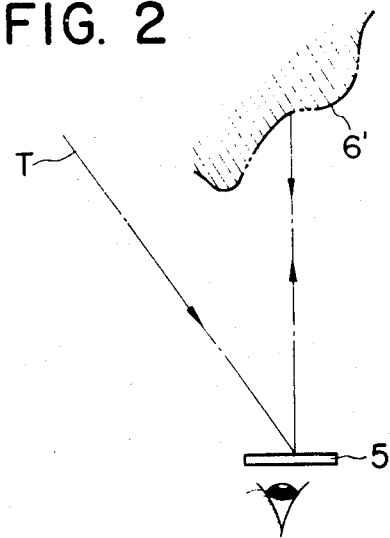
FIG. 2 is a view for explanation of one method of holographic reconstruction.

Therefore when the Fabry-Perot etalon 4 is so arranged that 2D is substantially equal to or slightly less than the coherent length L and when the object illuminating beam path is so arranged that its minimum optical length $l_2$ can satisfy the relation of $l_2-l_1=-L$, the depth of reconstructed wave fronts can be improved as much as $n$ times when the hologram 5 is illuminated by the parallel wave light beam T as shown in FIG. 2, where $n$ is dependent upon the characteristics of a holographic apparatus and techniques and is possible to become from 10 to 20.

When the spacing of the Fabry-Perot etalon 4 is so arranged that 2D>L the depth in which the wave fronts are reconstructed is only within the range given by the following relation:

$$(2n-1)L<|l_2-l_1|<(2n+1)L.$$

Therefore, upon the reconstructed wave fronts or images are formed patterns consisting of dark areas representing the wave fronts not reconstructed and light areas representing the wave fronts reconstructed. These "contour lines" represent the depth of the object in terms of optical length 2D so that the depth of the object 6 may be measured.

From the foregoing, it is seen that the depth in which the wave fronts can be reconstructed can be increased. Furthermore, when the spacing of the Fabry-Perot etalon is so arranged that 2D>L the depth of an object can be measured. Many advantages can be accrued of the present invention when it is employed in various fields.

What is claimed is:

1. In the formation of a hologram by the exposure of a hologram plate to coherent radiation of coherent length L including exposure to a reference beam and exposure to a beam reflected from an object having a depth dimension much greater than said coherence length, the method of providing contour lines representative of the depth of the object comprising:

interposing a Fabry-Perot etalon in the optical path of said reference beam, the distance D between the mirrors of said etalon being such that 2D>L.

* * * * *